(No Model.)

E. R. HYDE.
Belt Fasteners.

No. 231,671.  Patented Aug. 31, 1880.

Witnesses:
E. W. Newell.
F. H. Richards.

Inventor.
Elwin R. Hyde

UNITED STATES PATENT OFFICE.

ELWIN R. HYDE, OF DALTON, MASSACHUSETTS.

BELT-FASTENER.

SPECIFICATION forming part of Letters Patent No. 231,671, dated August 31, 1880.

Application filed June 17, 1880. (No model.)

*To all whom it may concern:*

Be it known that I, ELWIN R. HYDE, of Dalton, in the county of Berkshire and State of Massachusetts, have invented a new and useful Improvement in Belt-Hooks, which improvement is fully set forth in the following specification, reference being had to the accompanying drawings, in which—

Figure 1:
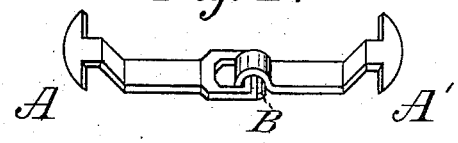
Figure 2:
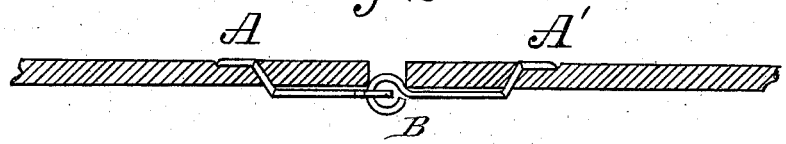
Figure 3:
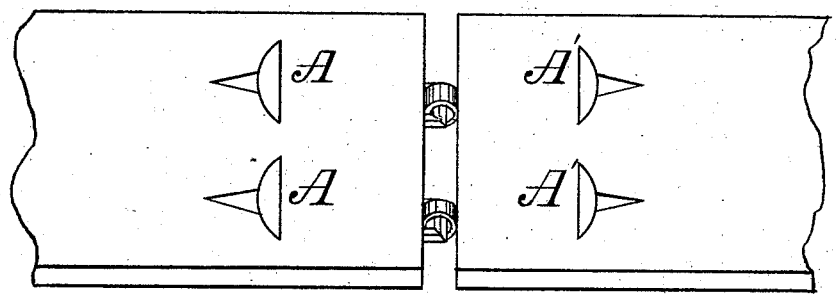

Figure 1 is a perspective view of an inverted belt-hook. Fig. 2 is a longitudinal section of an inverted belt-hook and belt fastened thereby, and Fig. 3 is a plan view of the under side of a belt having its contiguous ends joined by the belt-hook.

This invention belongs to that class of belt-fasteners in which the two sections composing it form a hinge at the contiguous ends of the belt secured, to insure its uniform flexibility; and it consists of two rigid counterpart ends of peculiar form, united by a flat hinge, to lie upon the top surface of the belt, opposite the interval between its ends, when the hook ends of the fastener are secured by being simply inserted through the belt, the object of the invention being to obtain the advantages of a flexible fastener combined with the security, or more than the security, and facility of attachment of a rigid belt-hook; and this I accomplish as follows:

The sections A A', dropped or punched from a metal sheet thick enough to give the required strength and rigidity to the sections, are formed into a strong flat hinge, B, as shown in Fig. 1, by having one end of the section A' pass through a flat staple left in the corresponding end of the section A, to be bent to inclose a portion of the staple. The swell of the hinge thus formed extends into the slight space between the contiguous ends of the belt, to permit the flat upper arms of the sections to lie against the belt.

The sections A A', after extending some distance upon the upper surface of the belt, pass through it at nearly a right angle, as shown in Fig. 2, to leave a shoulder to receive the torsion of the belt.

The segmental ends to the sections, formed as seen in Fig. 1, have their broad surfaces parallel to those of the upper arms, and lie, when in position in the belt, as seen in Figs. 2, 3, flat against its under side.

It will be seen that the belt thus inclosed between the under surface of the upper arms and the upper surface of the segmental ends cannot straighten out the fastener by bending the shoulder-piece connecting the ends, for the reason that these surfaces, bearing against opposite sides of the belt, are prevented from approaching each other by the body of the belt itself, so that the torsion of the belt is thrown principally upon the hinge B, made of unusual strength to resist it, and the fastening cannot come loose through any giving or bending of its members.

The enlarged segmental heads resist any tendency of the leather to tear and release the hook, either by tension in the direction of movement of the belt, or by the buckling of the belt from meeting with any obstruction on the pulley by opposing a large shoulder-surface across the slit in the leather through which it is inserted.

To secure the fastener to the belt it is only necessary to make a slit in the proper position in each belt end to receive the segmental head, which is pushed through sidewise, and then turned to lie flat beneath the belt to bring the section of the hook of which it forms part in the proper position.

I am aware that the employment of a hinge-joint in a belt-hook is not new, and that segmental heads have been used in a belt-hook upon the ends of a rigid bar to have their shoulders bear against the belt at nearly a right angle to its surface, and make no claim to either principle; but

What I claim is—

In belt-hooks, the combination, with the hinge B, constructed as shown and described, of the rigid counterpart sections A A', formed, as shown, of flat upper arms united to flat segmental heads to inclose the belt between their bearing-surfaces, in the manner and for the purpose set forth.

ELWIN R. HYDE.

Witnesses:
 D. G. ZEIGLER,
 S. HERBERT BRALY.